(12) United States Patent
Vesterdal

(10) Patent No.: US 11,738,892 B2
(45) Date of Patent: Aug. 29, 2023

(54) SPACE SEEKER MOTION TEST METHOD

(71) Applicant: RAYTHEON COMPANY, Waltham, MA (US)

(72) Inventor: Alan F. Vesterdal, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 408 days.

(21) Appl. No.: 17/135,363

(22) Filed: Dec. 28, 2020

(65) Prior Publication Data
US 2022/0204192 A1    Jun. 30, 2022

(51) Int. Cl.
*B64G 7/00*      (2006.01)
*G01M 11/00*    (2006.01)

(52) U.S. Cl.
CPC ............... *B64G 7/00* (2013.01); *G01M 11/30* (2013.01); *B64G 2007/005* (2013.01)

(58) Field of Classification Search
CPC ...... G01M 11/30; G01M 13/00; G01M 11/00; G01M 99/00; B64G 7/00; B64G 2007/005; G01S 7/003; G01J 5/0896; G01J 5/061; G01J 1/58; G01J 5/522
See application file for complete search history.

(56) References Cited

U.S. PATENT DOCUMENTS

| | | | | |
|---|---|---|---|---|
| 3,084,454 A | * | 4/1963 | Schueller | B64G 7/00 434/34 |
| 5,520,002 A | * | 5/1996 | Ishikawa | H01J 37/18 62/55.5 |
| 6,183,564 B1 | * | 2/2001 | Reynolds | H01L 21/6719 156/345.31 |
| 7,297,055 B2 | * | 11/2007 | Sar | F17C 3/08 335/216 |
| 2015/0276364 A1 | * | 10/2015 | Sato | 701/3 |

FOREIGN PATENT DOCUMENTS

| | | | | |
|---|---|---|---|---|
| CN | 107782537 A | * | 3/2018 | ............ G01M 11/00 |
| CN | 109666888 A | * | 4/2019 | .......... C23C 14/042 |
| EP | 3173041 A1 | * | 5/2017 | ............ A61B 18/02 |
| JP | 3069910 B2 | * | 7/2000 | |

\* cited by examiner

*Primary Examiner* — Octavia Davis Hollington
(74) *Attorney, Agent, or Firm* — Lando & Anastasi, LLP

(57) ABSTRACT

A space seeker motion test system comprises a rough vacuum chamber including a space seeker holding fixture, a space chamber including a target to be imaged by a space seeker disposed in the space seeker holding fixture, a bellows coupling the space seeker holding fixture to the space chamber, a gate valve providing selective fluidic communication between the space seeker holding fixture and an internal volume of the space chamber through the bellows, a first vacuum pump configured to maintain the rough vacuum chamber at a rough vacuum, and a second vacuum pump configured to maintain the space chamber at high vacuum.

13 Claims, 2 Drawing Sheets

SPACE SEEKER MOTION TEST METHOD

BACKGROUND

Space seekers are optical systems that may be disposed within vehicles or projectiles that operate within space outside of or at high altitudes within the atmosphere of the Earth. Space seekers may be utilized to locate or track other vehicles or projectiles in space. A vehicle or projectile may utilize information provided by a space seeker to determine and execute an intercept course with another vehicle or projectile detected by the space seeker, for example, to disable a space-based threat such as an enemy missile.

SUMMARY

Aspects and embodiments are directed to a space seeker motion test apparatus and method of operating same.

In one aspect, there is provided a space seeker motion test system. The system comprises a rough vacuum chamber including a space seeker holding fixture, a space chamber including a target to be imaged by a space seeker disposed in the space seeker holding fixture, a bellows coupling the space seeker holding fixture to the space chamber, a gate valve providing selective fluidic communication between the space seeker holding fixture and an internal volume of the space chamber through the bellows, a first vacuum pump configured to maintain the rough vacuum chamber at a rough vacuum, and a second vacuum pump configured to maintain the space chamber at high vacuum.

In some embodiments, the system further comprises a cryogenic cooling system configured to maintain the space chamber at cryogenic temperature.

In some embodiments, the gate valve comprises a seeker gate valve disposed on an end of the bellows proximate the space seeker holding fixture. The gate valve may further comprises a chamber gate valve disposed on an end of the bellows proximate the space chamber.

In some embodiments, the system further comprises a motion system disposed within the rough vacuum chamber and mechanically coupled to the space seeker holding fixture.

In some embodiments, the bellows couples an equipment optics cavity coupled to the space seeker holding fixture to the space chamber.

In some embodiments, the first vacuum pump configured to maintain the rough vacuum chamber at a pressure of no greater than 1 torr.

In some embodiments, the second vacuum pump configured to maintain the space chamber at a pressure of below about $10^{-7}$ torr.

In accordance with another aspect, there is provided a method of testing a space seeker. The method comprises mounting the space seeker within a space seeker holding fixture disposed within a rough vacuum chamber, the space seeker holding fixture selectively fluidly coupled to a space chamber including a back body target by a bellows and a gate valve, reducing a pressure in the space chamber to a high vacuum, cooling the space chamber to a cryogenic temperature, reducing the pressure in the rough vacuum chamber to a rough vacuum, and opening the gate valve to provide a line of sight between the space seeker and black body target.

In some embodiments, the method further comprises pointing the space seeker toward the black body with a motion system disposed in the rough vacuum chamber.

In some embodiments, opening the gate valve includes opening a seeker gate valve disposed on an end of the bellows proximate the space seeker holding fixture.

In some embodiments, opening the gate valve further includes opening a chamber gate valve disposed on an end of the bellows proximate the space chamber.

In some embodiments, the method further comprises reducing a pressure within the seeker gate valve, chamber gate valve, and bellows to the high vacuum.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the disclosure. For purposes of clarity, not every component may be labeled or shown in every figure. In the figures.

DETAILED DESCRIPTION

Figure 1:
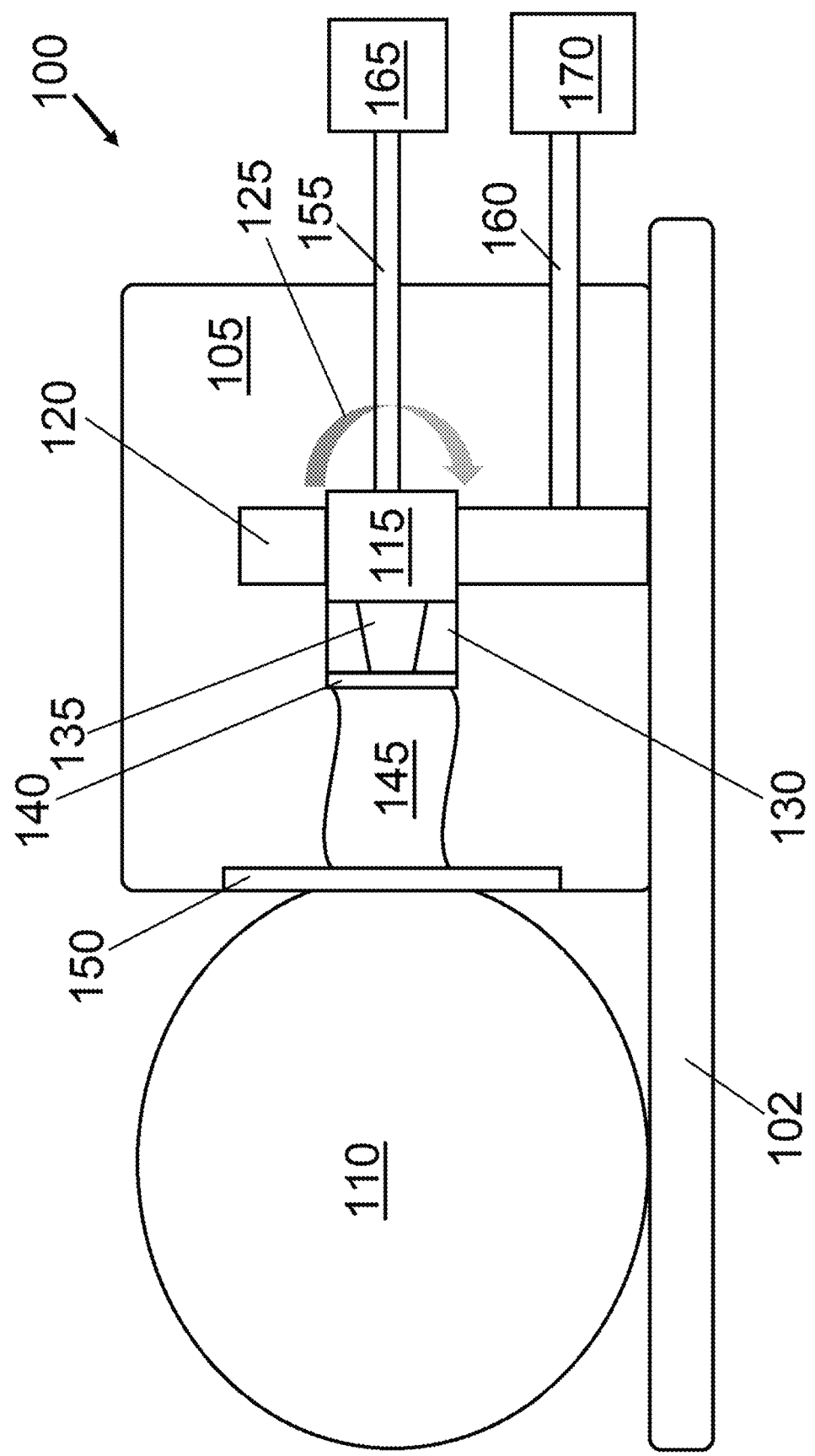
FIG. 1 illustrates an example of a space seeker test system.

Aspects and embodiments disclosed herein provide a practical method to provide flight-simulating motion testing of space seekers while simultaneously providing an optical target along with the correct (simulated space) radiometric background. Aspects and embodiments provide for the testing of a space seeker utilizing tactical electronics and algorithms in motion with a representative space target/background scene. This is highly desirable for both engineering development tests such as software flight qualification and also Tier 2 production where a missile defense customer may stress "test as you fly". Currently no practical method exists to do so.

Aspects and embodiments disclosed herein provide a means to perform a high-fidelity space seeker tactical tracking test for production at a greatly reduced cost in both time and schedule. The disclosed aspects and embodiments also allow a means to perform higher-fidelity integration and flight qualification tests for space seeker software, which currently is done mainly in simulation since there is no high-fidelity capability.

One unsuccessful method of providing a space seeker test system was attempted using a vacuum bellows exposed to atmosphere on the outside, which created an unworkable force that prevented motion of the space seeker optics. A different proposal was to use a vacuum-sealed gimballed joint between the seeker and the space chamber, but this was rejected as having too much friction and being too likely to leak to support high vacuum. A turn-buckle bellows has also been proposed but does not support the necessary freedom of motion. A method was implemented for a one-off experiment that placed the entire seeker and motion system within shared high vacuum space with the space chamber. This had several undesirable effects such as: high expense, long test setup time, and the risk of contamination to the seeker optics and the space chamber from particles and outgassing of the motion system. For these reasons this was not a practical solution for production testing.

Aspects and embodiments disclosed herein use a rough vacuum antechamber to house the seeker and motion system along with the outside of a vacuum bellows that will connect the seeker optics cavity directly to the space chamber. This will protect the space chamber and seeker optics cavity from contamination, provide a target with the correct radiometric background, and allow proper motion of the seeker simulating flight. Although the absolute pressure levels of rough vacuum and high vacuum differ by many orders of magnitude, the differential force exerted between the two is negligible with respect to the area of a bellows of the size needed to test a typical space seeker. This allows for a practical method of testing a space seeker using a new combination of existing technologies. The disclosed system and method relieves the mechanical force that would otherwise be exerted on the bellows by the surrounding atmosphere and provides freedom of motion not present in the previous attempt, while still maintaining the high vacuum needed for the space chamber and seeker optics cavity Aspects and embodiments disclosed herein provide significant advantages over the "shared volume" approach with the seeker and motion system all in the same vacuum space. These advantages include, but are not limited to providing for a quick test setup time (<1 hour to pump down vs. likely multiple days needed to remove water and reach high vacuum if it would even be achievable)—this could be done multiple times per day if needed. Greatly reduced cleanliness and outgassing requirements would be needed for the motion system and the seeker exterior. The disclosed system and method is inexpensive to implement and removes the risk of contaminating the space chamber and/or seeker optics with water, non-volatile residues and particles. The setup is tolerant of much larger vacuum leaks in the antechamber than would be the case with the "shared volume" approach.

One example of a space seeker test system is illustrated in FIG. 1, indicated generally at 100 mounted on an optics table 102. The test system includes a rough vacuum chamber 105 housing the space seeker and associated motion system and other components, including a low background scanning point source 110 (a.k.a. "space chamber") maintained at high vacuum during use. The space chamber 110 may have dimensions of about six to seven feet in diameter and about nine to 10 feet in length. The space chamber 110 includes a precisely controlled black body representing a target and is maintained under high vacuum (<10 E−7 torr) and cryogenic temperature (~80 Kelvin) to simulate the environment of outer space.

The space seeker is disposed within a housing 115 within the rough vacuum chamber 105. A motion system 120 is mechanically connected to the space seeker housing 115 and may include motors or servos to impart rotational or transverse motion 125 to the space seeker in three dimensions. A test equipment optics cavity 130 is attached to the space seeker housing 115 and includes the space seeker telescope 135. A seeker gate valve 140 is disposed between the test equipment optics cavity 130 and a first end of bellows 145. A chamber gate valve 150 is disposed between a second end of the bellows 145 and the space chamber 110. The seeker gate valve 140 may be closed to hermetically seal the test equipment optics cavity 130 from an internal volume of the bellows 145. The chamber gate valve 150 may be closed to hermetically seal the internal volume of the space chamber 110 from the internal volume of the bellows 145. The seeker gate valve 140 and chamber gate valve 150 may be opened to provide for the space seeker to see though the telescope 135 and the bellows 145 into the space chamber 110. The bellows 145 is flexible and provides for the motion system 120 to move or rotate the space seeker while providing a line of sight from the space seeker telescope 135 into the space chamber when the seeker gate valve 140 and chamber gate valve are opened.

The inside of the chamber gate valve 150, inside of the bellows 145, inside of the seeker gate valve 140, inside of the test equipment optics cavity 130, and the seeker telescope 135 are maintained at high vacuum. Everything else will be maintained at rough vacuum.

Feedthrough conduits 155, 160 may extend from inside the rough vacuum chamber to outside equipment 165, 170. The outside equipment 165, 170 may include a high vacuum pump that may be in fluid communication with the portions of the test system maintained at high vacuum through, for example, feedthrough conduit 155. Feedthrough conduit 155 is illustrated connected to the space seeker housing 115 but may be connected to any other portion of the system that is in fluid communication with the portions of the test system maintained at high vacuum. A roughing pump capable of maintaining rough vacuum in the rough vacuum chamber 105 may be included in the outside equipment 165, 170 and fluidly coupled to the internal volume of the rough vacuum chamber by, for example, feedthrough conduit 160. The outside equipment 165, 170 may also include a source of cryogenic fluid (e.g., liquid nitrogen) for cooling the space chamber 110, a power supply for the various components of the system, and a controller for the system.

Rough vacuum is quickly achieved in the rough vacuum chamber 105 using a roughing pump. The components exposed to the rough vacuum in the rough vacuum chamber are insensitive to small leaks, outgassing from the test equipment, residual moisture in the rough vacuum chamber, etc. Axial force on the bellows 145 that might push the space seeker toward the space chamber 110 and compress the bellows 145 should the rough vacuum chamber 105 be maintained at atmospheric pressure is virtually non-existent with the exterior of the bellows 145 at rough vacuum and the inside at high vacuum, permitting free motion of the bellows 145 and space seeker. Table 1 below illustrates the axial force that would be exerted on a 10 inch diameter bellows with a cross-sectional area of 79 in$^2$ at different pressures within the rough vacuum chamber 105 and the internal volume of the bellows 145 maintained at high vacuum ($10^{-7}$ torr). Here, rough vacuum is considered to be a pressure between $10^{-3}$ torr and 1 torr.

TABLE 1

| Axial force on bellows | | | | | |
| --- | --- | --- | --- | --- | --- |
| Bellows Diameter (in) | Area (sq in) | Absolute Pressure (torr) | Absolute Pressure (psi) | Axial Force (lbs) | Comment |
| 10 | 79 | 760 | 14.7 | 1155 | One std atmosphere |
| 10 | 79 | 1 | 0.019 | 1.52 | Max rough vacuum |
| 10 | 79 | 1.0E−03 | 1.93E−05 | 1.52E−03 | Min rough vacuum |
| 10 | 79 | 1.0E−07 | 1.93E−09 | 1.52E−07 | LSPS high vacuum |

A method of utilizing the space seeker test system may include mounting a space seeker into the space seeker housing 115 while the rough vacuum chamber 105 is at atmospheric pressure. The space chamber 110 may be maintained at high vacuum and/or cryogenic conditions while the space seeker is installed. If the space chamber 110 is not at high vacuum and/or cryogenic conditions while the space seeker is installed, it should be pumped down to high vacuum using a high vacuum pump included in the outside equipment 165, 170 and/or cooled to cryogenic temperature by pumping cryogenic fluid through from the outside equipment 165, 170 through the space chamber 110. Once the space chamber 110 is at high vacuum and cryogenic temperature, the rough vacuum chamber 105 may be pumped down to rough vacuum using a rough vacuum pump included in the outside equipment 165, 170. The rough vacuum chamber may be pumped down prior to or concurrent with pumping down the space chamber 110, however, it may be expected to take a much greater amount of time to pump down the space chamber 110 to operating pressure than the rough vacuum chamber, so it may be beneficial in terms of power consumption by the rough vacuum pump to pump down the rough vacuum chamber 105 after the space chamber 110. Once the rough vacuum chamber 105 and space chamber 110 reach their desired operating pressures and temperatures, the black body within the space chamber 110 may be activated. The seeker gate valve 140 and chamber gate valve 150 may be opened to allow the space seeker to attempt to optically acquire the black body, for example by using the motion system 120 to point the seeker telescope 135 toward the black body, and perform any desired calibrations or testing. If the bellows 145 and/or inside of the chamber gate valve 150, and/or inside of the seeker gate valve 140, and/or inside of the test equipment optics cavity 130, and/or seeker telescope 135 are coupled to a high vacuum pump separately from the space chamber 110, these components should be pumped down to high vacuum prior to opening the chamber gate valve 150.

Figure 2:
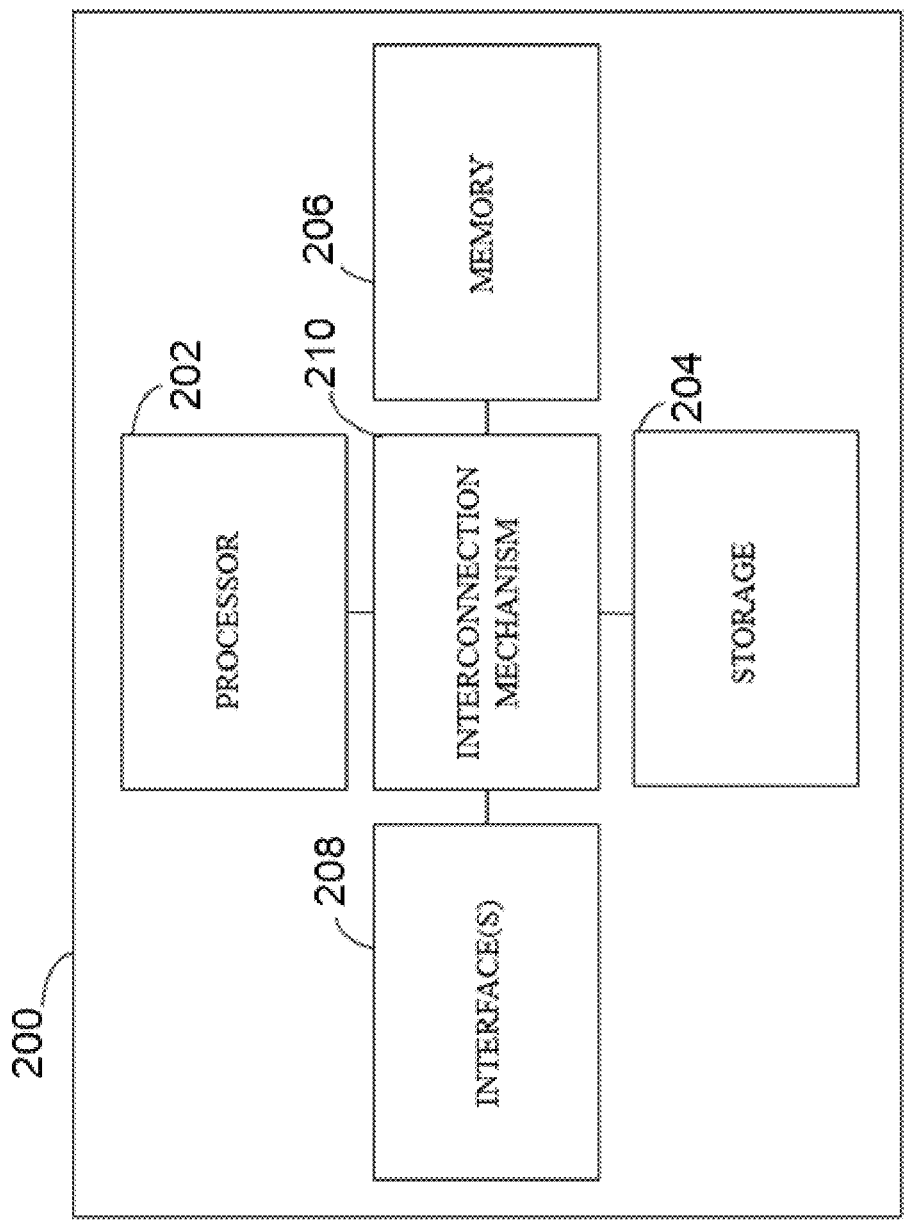
FIG. 2 is a functional block diagram of one example of a processing system that may be used in aspects of the present invention.

FIG. 2 illustrates one example of a processing system 200 that may be included as a controller for the space seeker test system disclosed herein. The processing system 200 may include a processor 202, data storage 204, a memory 206, and one or more interfaces 208, such as a system interface and/or a user interface. While not explicitly illustrated in FIG. 2, in certain examples the processing system 200 may be coupled to a power source. The power source may deliver power to one or more components of the processing system 200, as well as other components of the space seeker test system.

In FIG. 2, the processor 202 is coupled to the data storage 204, memory 206, and the various interfaces 208. The memory 206 stores programs (e.g., sequences of instructions coded to be executable by the processor 202) and data during operation of the processing system 200. Thus, the memory 206 may be a relatively high performance, volatile, random access memory such as a dynamic random access memory ("DRAM") or static memory ("SRAM"). However, the memory 206 may include any device for storing data, such as a disk drive or other nonvolatile storage device. Various examples may organize the memory 206 into particularized and, in some cases, unique structures to perform the functions disclosed herein. These data structures may be sized and organized to store values for particular data and types of data.

The data storage 204 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 202 to perform any of the functions described herein.

In various examples, the processing system 200 includes several interface components 208, such as a system interface and/or a user interface. Each of the interface components 208 is configured to exchange, e.g., send or receive, data with other components of the processing system 200 (and/or associated optical receiver), or other devices in communication with the processing system 200. According to various examples, the interface components 208 may include hardware components, software components, or a combination of hardware and software components. In certain examples, components of the system interface couple the processor 202 to one or more components of the optical receiver. The system interface may provide one or more control signals to any such components and may manage the operation of such components, as described above. In some examples, processor 202 corresponds to a controller of the optical receiver.

A user interface may include hardware and/or software components that allow the optical receiver to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 200. Data received at the various interfaces may be provided to the processor 202, as illustrated in FIG. 2. Communication coupling (e.g., shown interconnection mechanism 210) between the processor 202, memory 206, data storage 204, and interface(s) 208 may be implemented as one or more physical busses in conformance with standard, proprietary, or specialized computing bus technologies.

The processor 202 performs a series of routines (e.g., digital signal processing instructions) that result in manipulated data that is stored in and retrieved from the data storage 204, as discussed above. In various examples, the series of instructions result in interpretation of the outputs from the optical resonator, as discussed above. Such instructions may correspond to commands for interpreting peaks and troughs of such output signals to determine phase, amplitude, and/or frequency changes, and recovering information therefrom.

The processor 202 may be any type of processor, multi-processor or controller. For instance, the processor may include a processor manufactured by INTEL, AMD, MOTOROLA, or FREESCALE. In some examples, the processor 202 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Examples of specific implementations are provided herein for illustrative purposes only and are not intended to be limiting. Accordingly, the foregoing description and drawings are by way of example only, and the scope of the invention should be determined from proper construction of the appended claims, and their equivalents.

What is claimed is:

1. A space seeker motion test system comprising:
a rough vacuum chamber including a space seeker holding fixture;
a space chamber including a target to be imaged by a space seeker disposed in the space seeker holding fixture;
a bellows coupling the space seeker holding fixture to the space chamber;
a gate valve providing selective fluidic communication between the space seeker holding fixture and an internal volume of the space chamber through the bellows;
a first vacuum pump configured to maintain the rough vacuum chamber at a rough vacuum; and
a second vacuum pump configured to maintain the space chamber at high vacuum.

2. The system of claim 1, further comprising a cryogenic cooling system configured to maintain the space chamber at cryogenic temperature.

3. The system of claim 1, where the gate valve comprises a seeker gate valve disposed on an end of the bellows proximate the space seeker holding fixture.

4. The system of claim 3, where the gate valve further comprises a chamber gate valve disposed on an end of the bellows proximate the space chamber.

5. The system of claim 1, further comprising a motion system disposed within the rough vacuum chamber and mechanically coupled to the space seeker holding fixture.

6. The system of claim 1, wherein the bellows couples an equipment optics cavity coupled to the space seeker holding fixture to the space chamber.

7. The system of claim 1, wherein the first vacuum pump configured to maintain the rough vacuum chamber at a pressure of no greater than 1 torr.

8. The system of claim 1, wherein the second vacuum pump configured to maintain the space chamber at a pressure of below about $10^{-7}$ torr.

9. A method of testing a space seeker, the method comprising:
mounting the space seeker within a space seeker holding fixture disposed within a rough vacuum chamber, the space seeker holding fixture selectively fluidly coupled to a space chamber including a black body target by a bellows and a gate valve;
reducing a pressure in the space chamber to a high vacuum;
cooling the space chamber to a cryogenic temperature;
reducing the pressure in the rough vacuum chamber to a rough vacuum; and
opening the gate valve to provide a line of sight between the space seeker and black body target.

10. The method of claim 9, further comprising pointing the space seeker toward the black body with a motion system disposed in the rough vacuum chamber.

11. The method of claim 9, wherein opening the gate valve includes opening a seeker gate valve disposed on an end of the bellows proximate the space seeker holding fixture.

12. The method of claim 11, wherein opening the gate valve further includes opening a chamber gate valve disposed on an end of the bellows proximate the space chamber.

13. The method of claim 12, further comprising reducing a pressure within the seeker gate valve, chamber gate valve, and bellows to the high vacuum.

* * * * *